United States Patent
Nakajima

(10) Patent No.: US 11,046,123 B2
(45) Date of Patent: Jun. 29, 2021

(54) TYRE

(71) Applicant: SUMITOMO RUBBER INDUSTRIES, LTD., Hyogo (JP)

(72) Inventor: Koichi Nakajima, Hyogo (JP)

(73) Assignee: SUMITOMO RUBBER INDUSTRIES, LTD., Hyogo (JP)

(*) Notice: Subject to any disclaimer, the term of this patent is extended or adjusted under 35 U.S.C. 154(b) by 255 days.

(21) Appl. No.: 16/273,545

(22) Filed: Feb. 12, 2019

(65) Prior Publication Data

US 2019/0263192 A1   Aug. 29, 2019

(30) Foreign Application Priority Data

Feb. 28, 2018   (JP) .............................. JP2018-034036

(51) Int. Cl.
  *B60C 13/00*   (2006.01)
  *B60C 13/02*   (2006.01)

(52) U.S. Cl.
  CPC ............ *B60C 13/001* (2013.01); *B60C 13/02* (2013.01)

(58) Field of Classification Search
  CPC .............................. B60C 13/001; B60C 13/02
  See application file for complete search history.

(56) References Cited

U.S. PATENT DOCUMENTS

| 5,728,242 A | * | 3/1998 | Barrese ................. | B60C 13/001 |
| | | | | 152/523 |
| 2008/0283169 A1 | * | 11/2008 | Sato ....................... | B60C 13/001 |
| | | | | 152/450 |
| 2010/0051159 A1 | * | 3/2010 | Fujioka ................. | B60C 13/001 |
| | | | | 152/523 |
| 2012/0227879 A1 | * | 9/2012 | Muhlhoff ............... | B23K 26/36 |
| | | | | 152/151 |
| 2017/0050473 A1 | | 2/2017 | Muhlhoff et al. | |
| 2018/0099530 A1 | * | 4/2018 | Yonetsu ................. | B29D 30/72 |
| 2019/0202244 A1 | * | 7/2019 | Okamatsu ................ | C08K 3/04 |

FOREIGN PATENT DOCUMENTS

| EP | 0490247 A1 | * | 6/1992 | ........... B60C 13/001 |
| JP | 9-86106 A | | 3/1997 | |
| JP | H0986106 | | 3/1997 | |

* cited by examiner

*Primary Examiner* — Jacob T Minskey
*Assistant Examiner* — Virak Nguon
(74) *Attorney, Agent, or Firm* — Greenblum & Bernstein, P.L.C.

(57) ABSTRACT

A mark indicating portion arranged on a sidewall portion is provided with a reference surface provided on a surface of the sidewall portion and a mark formed on the reference surface. A surface of the mark is inclined in a tyre circumferential direction. Further, the mark is provided with a concave portion in which the surface is lower than the reference surface and a convex portion in which the surface is higher than the reference surface. The concave portion is arranged on one side in the tyre circumferential direction and the convex portion is arranged on the other side in the tyre circumferential direction.

20 Claims, 5 Drawing Sheets

TYRE

TECHNICAL FIELD

The present invention relates to a tyre having improved legibility of a mark provided on a sidewall portion.

BACKGROUND ART

On a surface of at least one of the sidewall portions of the tyre, one or more marks which are letters, symbols, and the like indicating the manufacturer name, brand name, size, and the like of the tyre are formed. And in order to improve the legibility of the marks, for example, the marks are formed to be one step higher than the surface of the sidewall portion, and ridges are provided on the surfaces of the marks (for example, see Japanese unexamined Patent Application Publication No. H9-86106).

SUMMARY OF THE INVENTION

However, conventional marks have a constant height, therefore, even when a ridge is formed on the surface thereof, they have monotonous appearance and little change in contrast. Thereby, the legibility cannot be sufficiently improved.

An object of the present invention is to provide a tyre capable of improving design by providing a change in the appearance of the marks and capable of improving the legibility of the marks by giving contrast between the surfaces of the marks and their reference surface.

In one aspect of the present invention, a tyre comprises a sidewall portion provided with a mark indicating portion having one or more marks, wherein the mark indicating portion comprises a reference surface provided on a surface of the sidewall portion and the marks formed on the reference surface, a surface of the or each mark is inclined in a tyre circumferential direction with respect to the reference surface, the or each mark is provided with a concave portion in which a surface thereof is lower than the reference surface and a convex portion in which a surface thereof is higher than the reference surface, and the concave portion is arranged on one side in the tyre circumferential direction and the convex portion arranged on the other side in the tyre circumferential direction.

In another aspect of the invention, it is preferred that the mark indicating portion is provided with a base portion projecting from the surface of the sidewall portion at a constant height, and a surface of the base portion forms the reference surface.

In another aspect of the invention, it is preferred that a depth of the concave portion at a maximum depth portion thereof from the reference surface is not more than the height of the base portion from the surface of the sidewall portion.

In another aspect of the invention, it is preferred that the depth of the concave portion at the maximum depth portion from the reference surface is in a range of from 0.8 to 1.2 times a height of the convex portion at a maximum height portion thereof from the reference surface.

In another aspect of the invention, it is preferred that the mark indicating portion is provided with a plurality of small protruding portions on either the reference surface or the surface of the or each mark.

In another aspect of the invention, it is preferred that each of the small protruding portions is a truncated conical protrusion having a smaller diameter on a side of an upper end thereof.

In another aspect of the invention, it is preferred that each of the truncated conical protrusions has a maximum diameter in a range of from 50 to 1000 micro meters and a protruding height in a range of from 50 to 1000 micro meters, and a distance between centers of the truncated conical protrusions adjacent to each other is in a range of from 200 to 1000 micro meters.

In another aspect of the invention, it is preferred that each of the small protruding portions is a rib-shaped protrusion having a trapezoidal cross section with a thickness thereof decreasing toward an upper end thereof, and
the rib-shaped protrusions are arranged parallel to each other or in a non-parallel manner.

In another aspect of the invention, it is preferred that each of the rib-shaped protrusions has a maximum thickness in a range of from 20 to 1000 micro meters and a protruding height in a range of from 200 to 500 micro meters, and a distance between the rib-shaped protrusions adjacent to each other is in a range of from 10 to 800 micro meters.

DESCRIPTION OF THE PREFERRED EMBODIMENT

An embodiment of the present invention will now be described below in detail.

Figure 1:
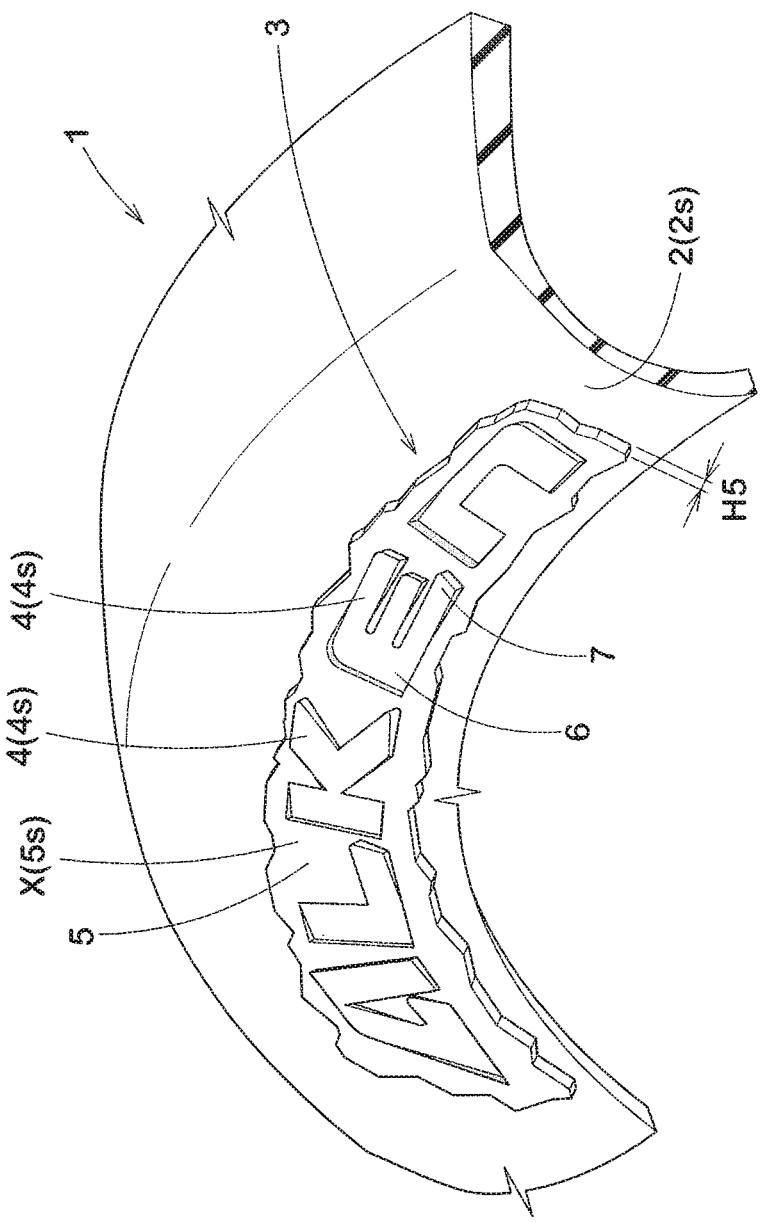
FIG. 1 is a partial perspective view of a tyre according to an embodiment of the present invention.

As shown in FIG. 1, a tyre 1 in this embodiment is provided with one or more mark indicating portions 3 in at least one of sidewall portions 2.

Each of the mark indicating portions 3 is provided with a reference surface (x) provided on a surface (2s) of a respective one of the sidewall portions 2 and one or more marks 4 formed on the reference surface (x). In this embodiment, each of the mark indicating portions 3 is provided with a base portion 5 which projects stepwise from the surface (2s) of a respective one of the sidewall portions 2 at a constant height (H5) (that is, a top surface of the base portion is not inclined with respect to the surface (2s)) and a surface (5s) of the base portion 5 forms the reference surface (x).

Each of the marks 4 is a letter, a symbol, a figure, and the like for representing the manufacturer name, brand name, size, and the like of the tyre, and in this embodiment, a case is shown in which a brand name consisting of a plurality of the marks 4 is formed on the reference surface (x).

Figure 2:
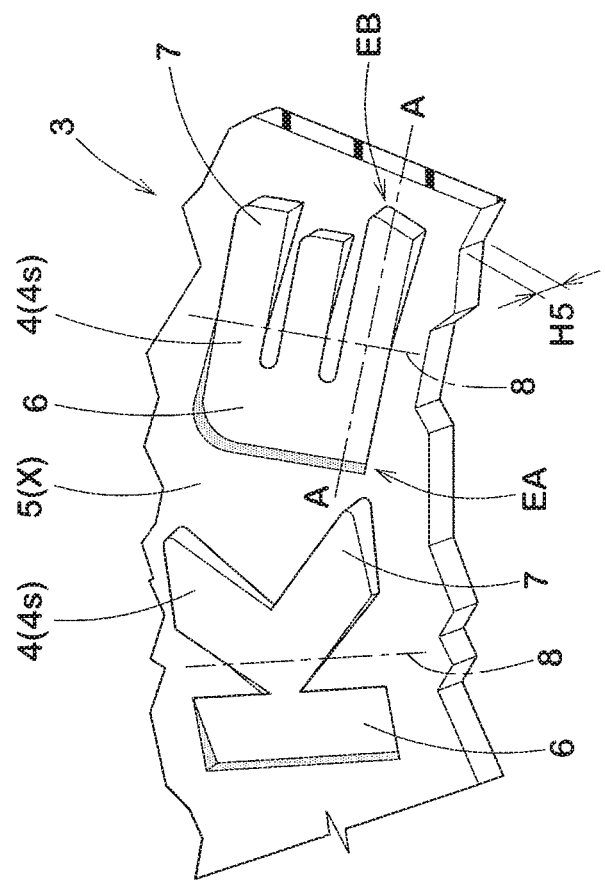
FIG. 2 is an enlarged partial perspective view of marks.
Figure 3:
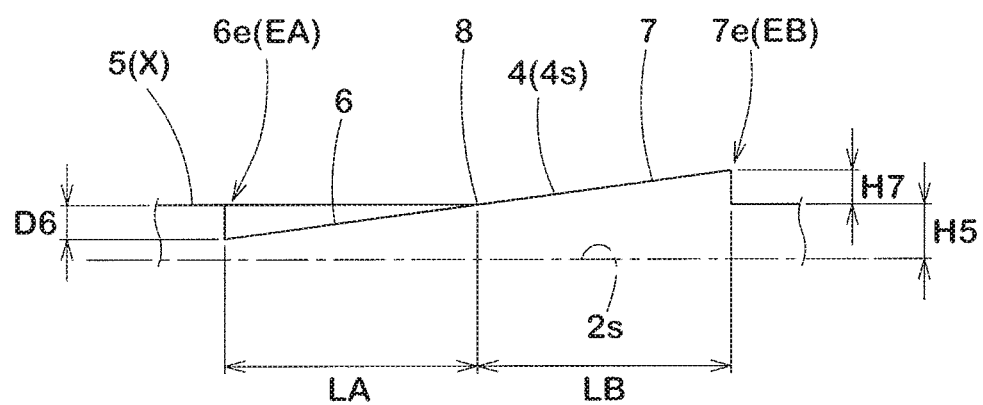
FIG. 3 is an enlarged cross-sectional view of one of the marks taken along A-A line of FIG. 2.

As shown in FIGS. 2 and 3, a surface (4s) of each of the marks 4 is inclined in a tyre circumferential direction with respect to the reference surface (x). And by this inclination, each of the marks 4 is provided with a concave portion 6 in which the surface (4s) thereof is lower (that is, positioned on an inner side of the tyre) than the reference surface (x), and a convex portion 7 in which the surface (4s) thereof is higher (that is, positioned on an outer side of the tyre) than the reference surface (x). The concave portion 6 is arranged on one side in the tyre circumferential direction (on the left in the figure) and the convex portion 7 is arranged on the other side in the tyre circumferential direction (on the right side in the figure). A boundary 8 between the concave portion 6 and the convex portion 7 has the same height as the reference surface (x). The boundary 8 in this embodiment extends in a tyre radial direction.

As just described, the surface (4s) of each of the marks 4 is inclined so that the concave portion 6 and the convex portion 7 are formed, therefore, each of the mark indicating portions 3 has a novel design in which a part of each of the marks 4 is buried in the base portion 5, thereby, a change is given to the appearance of the marks 4, therefore, it is possible that the design is improved. Further, because the surface (4s) of each of the marks 4 is inclined, it is possible that the manner of light reflection is made different from the reference surface (x), therefore, it is possible that contrast (difference in brightness) is increased. Moreover, in the marks 4, by the concave portions 6 and the convex portions 7, it is possible that a large change is caused in the shadow and that the stereoscopic effect is increased. And by the synergistic effect of these, it is possible that the legibility of the marks 4 is improved.

As shown in FIG. 3, in this embodiment, a depth (D6) from the reference surface (x) of the concave portion 6 at a maximum depth portion (6e) is not more than the height (H5) of the base portion 5 from the surface (2s) of the sidewall portion 2. In this embodiment, a case in which the depth (D6) is smaller than the height (H5) is shown. Thereby, it is possible that a gauge thickness of a sidewall rubber at the maximum depth portion (6e) is secured to be not less than a gauge thickness of the sidewall rubber at a portion thereof other than the mark indicating portions 3, therefore, it is possible that damage due to the concave portion 6 is suppressed.

It is preferred that the depth (D6) is in the range of from 0.8 to 1.2 times a height (H7) of the convex portion 7 from the reference surface (x) at a maximum height portion (7e), that is, it is preferred that the depth (D6) and the height (H7) is about the same. Thereby, the distribution of the concave portion 6 and the convex portion 7 is balanced, therefore, it is possible that the effect of improving the legibility is increased. For the similar reason, it is preferred as well that in each of the marks 4, a distance (LA) in the tyre circumferential direction between the boundary 8 and an end portion (EA) on one side in the tyre circumferential direction of the mark 4 is in the range of from 0.8 to 1.2 times a distance (LB) in the tyre circumferential direction between the boundary 8 and an end portion (EB) on the other side in the tyre circumferential direction of the mark 4.

Here, the end portion (EA) means an end positioned on the one side in the tyre circumferential direction of each of the marks 4, and the end portion (EB) means an end positioned on the other side in the tyre circumferential direction of each of the marks 4. Further, the maximum depth portion (6e) of the concave portion 6 is formed at the position of the end portion (EA), and the maximum height portion (7e) of the convex portion 7 is formed at the position of the end portion (EB).

It is preferred that the surface (4s) of each of the marks 4 is a flat surface, however, it may be a curved surface extending curvedly in an arc shape in the tyre circumferential direction, for example.

Figure 4A:
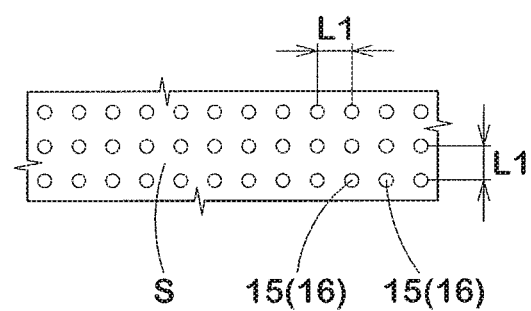
FIG. 4A is a partial plan view showing an arrangement of small protruding portions formed as truncated conical protrusions.
Figure 4B:
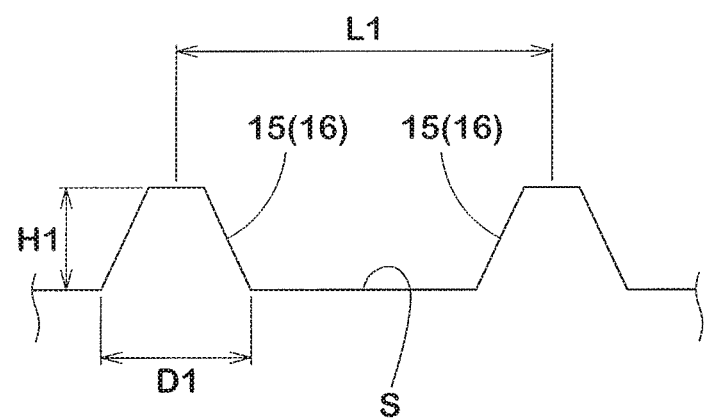
FIG. 4B is a cross-sectional view of the truncated conical protrusions.

Further, in each of the mark indicating portions 3, as shown in FIGS. 4A and 4B, it is preferred that a surface (s) which is either the reference surface (x) or the surface (4s) of each of the marks 4 is provided with a plurality of small protruding portions 15 each protruding from the surface (s). In this embodiment, a case where each of the small protruding portions 15 is a truncated conical protrusion 16 having a smaller diameter on a side of an upper end thereof is shown. It is preferred that each of the truncated conical protrusions 16 has a maximum diameter (D1) in the range of from 50 to 1000 micro meters and a protruding height (H1) from the surface (s) in the range of from 50 to 1000 micro meters, and that a distance (L1) between centers of the small protruding portions 15 adjacent to each other is in the range of from 200 to 1000 micro meters.

It is possible that the truncated conical protrusions 16 configured as such irregularly reflect light and make the surface (s) (the reference surface (x) or the surface (4s) of the mark 4) look black. Thereby, it is possible that the contour shapes of the marks 4 are made clearer, therefore, it is possible that the legibility of the marks 4 is further improved. As a result of research by the present inventor, when the maximum diameter (D1) and the protruding height (H1) of each of the truncated conical protrusions 16, and the distance (L1) of the truncated conical protrusions 16 are outside the above ranges, the surface (s) looks whitish due to the reflection of light, therefore, the contrast difference between the marks 4 and the reference surface (x) tends to be decreased. Note that by configuring each of the small protruding portions 15 to have a truncated cone shape, it is possible that the reflection of light is further suppressed while the strength is increased as compared with a cylindrical shape.

In this embodiment, a case is shown in which the truncated conical protrusions 16 are arranged in a grid pattern, but they may be arranged in a staggered pattern, or may be randomly arranged as long as the distance (L1) satisfies the above range.

Figure 5A:
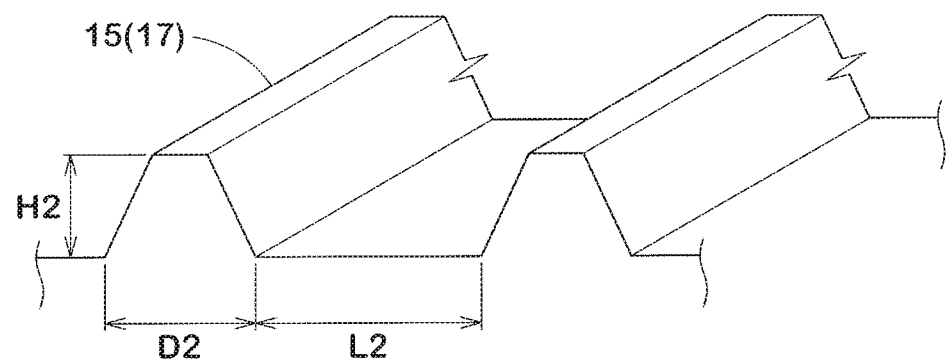
FIG. 5A is a partial perspective view showing an arrangement and cross sections of the small protruding portions formed as rib-shaped protrusions.
Figure 5B:
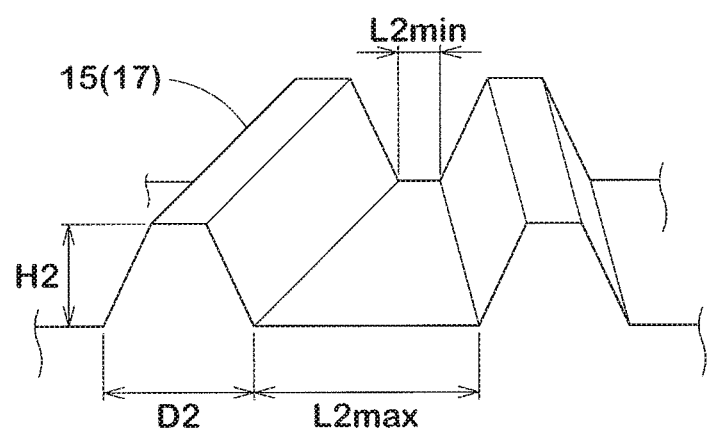
FIG. 5B is a partial perspective view showing another arrangement and the cross sections of the small protruding portions formed as the rib-shaped protrusions.

FIGS. 5A and 5B show another embodiment of the small protruding portions 15. In this embodiment, a case is shown where each of the small protruding portions 15 is a rib-shaped protrusion having a trapezoidal cross section with a thickness thereof decreasing toward an upper end thereof. The rib-shaped protrusions 17 can be arranged parallel to each other as shown in FIG. 5A, or they can be arranged so as not to be parallel to each other (non-parallel) as shown in FIG. 5B. It is preferred that each of the rib-shaped protrusions 17 has a maximum thickness (D2) in the range of from 20 to 1000 micro meters and a protruding height (H2) in the range of from 200 to 500 micro meters, and that a distance (L2) between the rib-shaped protrusions 17 adjacent to each other is in the range of from 10 to 800 micro meters. Note that in a case where the rib-shaped protrusions 17 are arranged in the non-parallel manner, it is preferred that an average value of a maximum value (L2max) and a minimum value (L2min) of the distance (L2) is in the range of from 10 to 800 micro meters.

As is the case with the truncated conical protrusions 16, it is possible that the rib-shaped protrusion 17 irregularly reflect light and make the surface (s) (the reference surface (x) or the surface (4s) of the mark 4) look black. Thereby, it is possible that the contour shapes of the marks 4 are made clearer, therefore, it is possible that the legibility of the marks 4 is further improved. As a result of research by the present inventor, when the maximum thickness (D2) and the protruding height (H2) of each of the rib-shaped protrusions 17, and the distance (L2) of the rib-shaped protrusions 17 are outside the above ranges, the surface (s) looks whitish due to the reflection of light, therefore, the contrast difference between the marks 4 and the reference surface (x) tends to be decreased. Note that, from a point of view of the contrast, it is more preferred that the rib-shaped protrusions 17 are arranged in the non-parallel manner.

In each of the mark indicating portions 3, it is possible that the marks 4 are directly formed on the surface (2s) of a respective one of the sidewall portions 2 without having the base portion 5 formed thereon. In this case, the surface (2s) of the sidewall portion 2 forms the reference surface (x). In this case, in order to distinguish the mark indicating portions 3 from other portions, it is preferred that the surface (2s) of each of the sidewall portions 2 is provided with a rib and the like having a small height and surrounding each of the mark indicating portions 3.

While detailed description has been made of the tyre as especially preferred embodiments of the present invention, the present invention can be embodied in various forms without being limited to the illustrated embodiments.

Working Examples (Examples)

Tyres provided with the mark indicating portions on the surfaces of the sidewall portions were made by way of test according to the specifications listed in Table 1, and then the legibility of the marks was compared. The height of the base portion was the same for all of the test tyres, and the protruding height (the maximum height if the surface of each of the marks was inclined) of each of the marks from the surface (the reference surface (x)) of the base portion was the same for all of the test tyres.

In Reference 1, each of the marks had a constant height from the base portion. In Reference 2, the surface of each of the marks was inclined but the whole body of each of the marks was protruded from the base portion. In Examples 1 to 6, the depth (D6) at the maximum depth portion of each of the concave portions was not more than the height (H5) of the base portion.

In the References 1 and 2, and the Examples 1 to 3, 5, and 6, the small protruding portions were formed on the surfaces of the marks. In the References 1 and 2, and the Examples 1 to 3, the small protruding portions were the truncated conical protrusions each having the maximum diameter (D1) of 320 micro meters and the protruding height (H1) of 500 micro meters, and the distance (L1) was 400 micro meters. In the Examples 5 and 6, the small protruding portions were the rib-shaped protrusions each having the maximum thickness (D2) of 160 micro meters and the protruding height (H2) of 200 micro meters, and the distance (L2) was 200 micro meters.

The legibility was evaluated by a visual observation and the evaluation is indicated by an index based on the Reference 1 being 100, wherein a larger numerical value is better.

TABLE 1

| <Mark indicating portion> | Ref. 1 | Ref. 2 | Ex. 1 | Ex. 2 | Ex. 3 | Ex. 4 | Ex. 5 | Ex. 6 |
|---|---|---|---|---|---|---|---|---|
| Base portion | Present | | | | | | | |
| Mark | Present | | | | | | | |
| Surface | Not inclined | | Inclined | | | | | |
| Concave portion | Absent | Absent | Present | | | | | |
| Convex portion | | | Present | | | | | |
| Depth (D6) of Concave portion/Height (H7) of Convex portion | — | — | 1.0 | 0.8 | 1.2 | 1.0 | 1.0 | 1.0 |
| Small protruding portion | Truncated conical protrusion | | | | | Absent | Rib-shaped protrusion (parallel) | Rib-shaped protrusion (non-parallel) |
| Legibility | 100 | 102 | 115 | 113 | 117 | 110 | 130 | 135 |

As shown in Table 1, it was confirmed that the tyres as the Examples showed excellent legibility of the marks.

The invention claimed is:

1. A tyre comprising a sidewall portion provided with a mark indicating portion having one or more marks,
    wherein the mark indicating portion comprises a reference surface provided on a surface of the sidewall portion and the one or more marks formed on the reference surface,
    wherein a surface of each mark is inclined in a tyre circumferential direction with respect to the reference surface, each mark has a concave portion in which a surface thereof is lower than the reference surface and a convex portion in which a surface thereof is higher than the reference surface, and the concave portion is arranged on one side in the tyre circumferential direction and the convex portion arranged on the other side in the tyre circumferential direction,
    wherein the surface of the sidewall portion is provided with a rib surrounding the mark indicating portion, and
    wherein the mark indicating portion has a plurality of the marks.

2. The tyre according to claim 1, wherein the mark indicating portion is provided with a base portion projecting from the surface of the sidewall portion at a constant height, and a surface of the base portion forms the reference surface.

3. The tyre according to claim 2, wherein a depth of the concave portion at a maximum depth portion thereof from the reference surface is not more than the height of the base portion from the surface of the sidewall portion.

4. The tyre according to claim 1, wherein the depth of the concave portion at the maximum depth portion from the reference surface is in a range of from 0.8 to 1.2 times a height of the convex portion at a maximum height portion thereof from the reference surface.

5. The tyre according to claim 1, wherein the mark indicating portion is provided with a plurality of small protruding portions on either the reference surface or the surface of each mark.

6. The tyre according to claim 5, wherein each of the small protruding portions is a truncated conical protrusion having a smaller diameter on a side of an upper end thereof.

7. The tyre according to claim 6, wherein each of the truncated conical protrusions has a maximum diameter in a range of from 50 to 1000 micro meter's and a protruding height in a range of from 50 to 1000 micro meters, and a distance between centers of the truncated conical protrusions adjacent to each other is in a range of from 200 to 1000 micro meters.

8. A tyre comprising a sidewall portion provided with a mark indicating portion having one or more marks,
   wherein the mark indicating portion comprises a reference surface provided on a surface of the sidewall portion and the one or more marks formed on the reference surface,
   wherein a surface of each mark is inclined in a tyre circumferential direction with respect to the reference surface, each mark has a concave portion in which a surface thereof is lower than the reference surface and a convex portion in which a surface thereof is higher than the reference surface, and the concave portion is arranged on one side in the tyre circumferential direction and the convex portion arranged on the other side in the tyre circumferential direction,
   wherein the surface of the sidewall portion is provided with a rib surrounding the mark indicating portion,
   wherein the mark indicating portion has a plurality of the marks, and
   wherein the mark indicating portion is provided with a plurality of small protruding portions on either the reference surface or the surface of each mark.

9. The tyre according to claim 8, wherein the mark indicating portion is provided with a base portion projecting from the surface of the sidewall portion at a constant height, and a surface of the base portion forms the reference surface.

10. The tyre according to claim 8, wherein a depth of the concave portion at a maximum depth portion thereof from the reference surface is not more than the height of the base portion from the surface of the sidewall portion.

11. The tyre according to claim 8, wherein the depth of the concave portion at the maximum depth portion from the reference surface is in a range of from 0.8 to 1.2 times a height of the convex portion at a maximum height portion thereof from the reference surface.

12. The tyre according to claim 8, wherein each of the small protruding portions is a truncated conical protrusion having a smaller diameter on a side of an upper end thereof.

13. The tyre according to claim 8, wherein each of the truncated conical protrusions has a maximum diameter in a range of from 50 to 1000 micro meter's and a protruding height in a range of from 50 to 1000 micro meters, and a distance between centers of the truncated conical protrusions adjacent to each other is in a range of from 200 to 1000 micro meters.

14. A tyre comprising a sidewall portion provided with a mark indicating portion having one or more marks,
   wherein the mark indicating portion comprises a reference surface provided on a surface of the sidewall portion and the one or more marks formed on the reference surface,
   wherein a surface of each mark is inclined in a tyre circumferential direction with respect to the reference surface, each mark has a concave portion in which a surface thereof is lower than the reference surface and a convex portion in which a surface thereof is higher than the reference surface, and the concave portion is arranged on one side in the tyre circumferential direction and the convex portion arranged on the other side in the tyre circumferential direction, and
   wherein the mark indicating portion is provided with a base portion projecting from the surface of the sidewall portion, and a surface of the base portion forms the reference surface.

15. The tyre according to claim 14, wherein the base portion projects from the surface of the sidewall portion at a constant height.

16. The tyre according to claim 14, wherein a depth of the concave portion at a maximum depth portion thereof from the reference surface is not more than the height of the base portion from the surface of the sidewall portion.

17. The tyre according to claim 14, wherein the depth of the concave portion at the maximum depth portion from the reference surface is in a range of from 0.8 to 1.2 times a height of the convex portion at a maximum height portion thereof from the reference surface.

18. The tyre according to claim 14, wherein the mark indicating portion is provided with a plurality of small protruding portions on either the reference surface or the surface of each mark,
   wherein each of the small protruding portions is a truncated conical protrusion having a smaller diameter on a side of an upper end thereof, and
   wherein each of the truncated conical protrusions has a maximum diameter in a range of from 50 to 1000 micro meter's and a protruding height in a range of from 50 to 1000 micro meters, and a distance between centers of the truncated conical protrusions adjacent to each other is in a range of from 200 to 1000 micro meters.

19. The tyre according to claim 14, wherein the mark indicating portion has a plurality of the marks.

20. The tyre according to claim 14, wherein a contour of the base portion does not extend along a contour of each mark.

* * * * *